United States Patent
Takimoto et al.

(10) Patent No.: US 11,437,882 B2
(45) Date of Patent: Sep. 6, 2022

(54) MOTOR-DRIVEN COMPRESSOR AND METHOD OF ASSEMBLING MOTOR-DRIVEN COMPRESSOR

(71) Applicant: KABUSHIKI KAISHA TOYOTA JIDOSHOKKI, Kariya (JP)

(72) Inventors: Shuji Takimoto, Kariya (JP); Taku Adaniya, Kariya (JP); Shozo Hamana, Kariya (JP)

(73) Assignee: KABUSHIKI KAISHA TOYOTA JIDOSHOKKI

( * ) Notice: Subject to any disclaimer, the term of this patent is extended or adjusted under 35 U.S.C. 154(b) by 352 days.

(21) Appl. No.: 16/852,975

(22) Filed: Apr. 20, 2020

(65) Prior Publication Data

US 2020/0343783 A1 Oct. 29, 2020

(30) Foreign Application Priority Data

Apr. 25, 2019 (JP) .............................. JP2019-084643

(51) Int. Cl.
*H02K 5/22* (2006.01)
*F04C 2/04* (2006.01)
(Continued)

(52) U.S. Cl.
CPC ............... *H02K 5/225* (2013.01); *F04C 2/04* (2013.01); *H02K 3/50* (2013.01); *H02K 7/14* (2013.01);
(Continued)

(58) Field of Classification Search
CPC ............ H02K 5/225; H02K 3/50; H02K 7/14; H02K 11/0094; H02K 11/33;
(Continued)

(56) References Cited

U.S. PATENT DOCUMENTS

| 5,348,455 A * | 9/1994 | Herrick ................. | F04C 18/324 |
| | | | 418/248 |
| 6,910,904 B2 * | 6/2005 | Herrick ................. | F04C 23/008 |
| | | | 439/942 |

(Continued)

FOREIGN PATENT DOCUMENTS

| CN | 104838139 A | 8/2015 |
| JP | 2015-183668 A | 10/2015 |
| JP | 2018-168832 A | 11/2018 |

*Primary Examiner* — John K Kim
(74) *Attorney, Agent, or Firm* — Sughrue Mion, PLLC

(57) ABSTRACT

The cluster block accommodates connection terminals and has conductive member insertion holes, into which the conductive members are inserted. The cluster block is disposed between the bottom wall of the housing and second coil ends. The conductive member insertion holes are located on the radially outer side of the inner circumferential surface of the stator core. The cluster block includes a second wall portion in the vicinity of the electric motor and a first wall in the vicinity of the bottom wall of the housing. The second wall portion has a pressed surface on the radially inner side of the inner circumferential surface of the stator core. The outer surface of the first wall portion has a contact surface that is lined up with the pressed surface in the axial direction of the stator core. The contact surface is allowed to contact the bottom wall of the housing.

6 Claims, 11 Drawing Sheets

(51) Int. Cl.
*H02K 7/14* (2006.01)
*H02K 3/50* (2006.01)
*H02K 11/33* (2016.01)
*H02K 15/00* (2006.01)
*H02K 11/00* (2016.01)

(52) U.S. Cl.
CPC ......... *H02K 11/0094* (2013.01); *H02K 11/33* (2016.01); *H02K 15/0062* (2013.01); *F04C 2230/604* (2013.01); *F04C 2240/40* (2013.01); *F04C 2240/803* (2013.01)

(58) Field of Classification Search
CPC ...... H02K 15/0062; H02K 3/522; F04C 2/04; F04C 2230/604; F04C 2240/40; F04C 2240/803; F04C 18/0215; F04C 29/0085; F04C 23/02; F04C 23/008; F04C 2240/30; F05B 2210/14; F05B 2230/60

USPC .......................................................... 310/71
See application file for complete search history.

(56) References Cited

U.S. PATENT DOCUMENTS

| 7,025,614 | B2 * | 4/2006 | Herrick ................. F04C 23/008 439/276 |
| 9,394,907 | B2 | 7/2016 | Fukasaku et al. |
| 9,970,428 | B2 | 5/2018 | Kinoshita et al. |
| 2015/0303762 | A1 | 10/2015 | Hagita et al. |
| 2015/0340919 | A1 * | 11/2015 | Murakami ............. H02K 5/225 310/71 |
| 2017/0279325 | A1 * | 9/2017 | Hamana ................. F04C 23/008 |
| 2019/0203715 | A1 * | 7/2019 | Heo .................... F04C 29/0085 |
| 2020/0343783 | A1 * | 10/2020 | Takimoto ........... H02K 15/0062 |

* cited by examiner

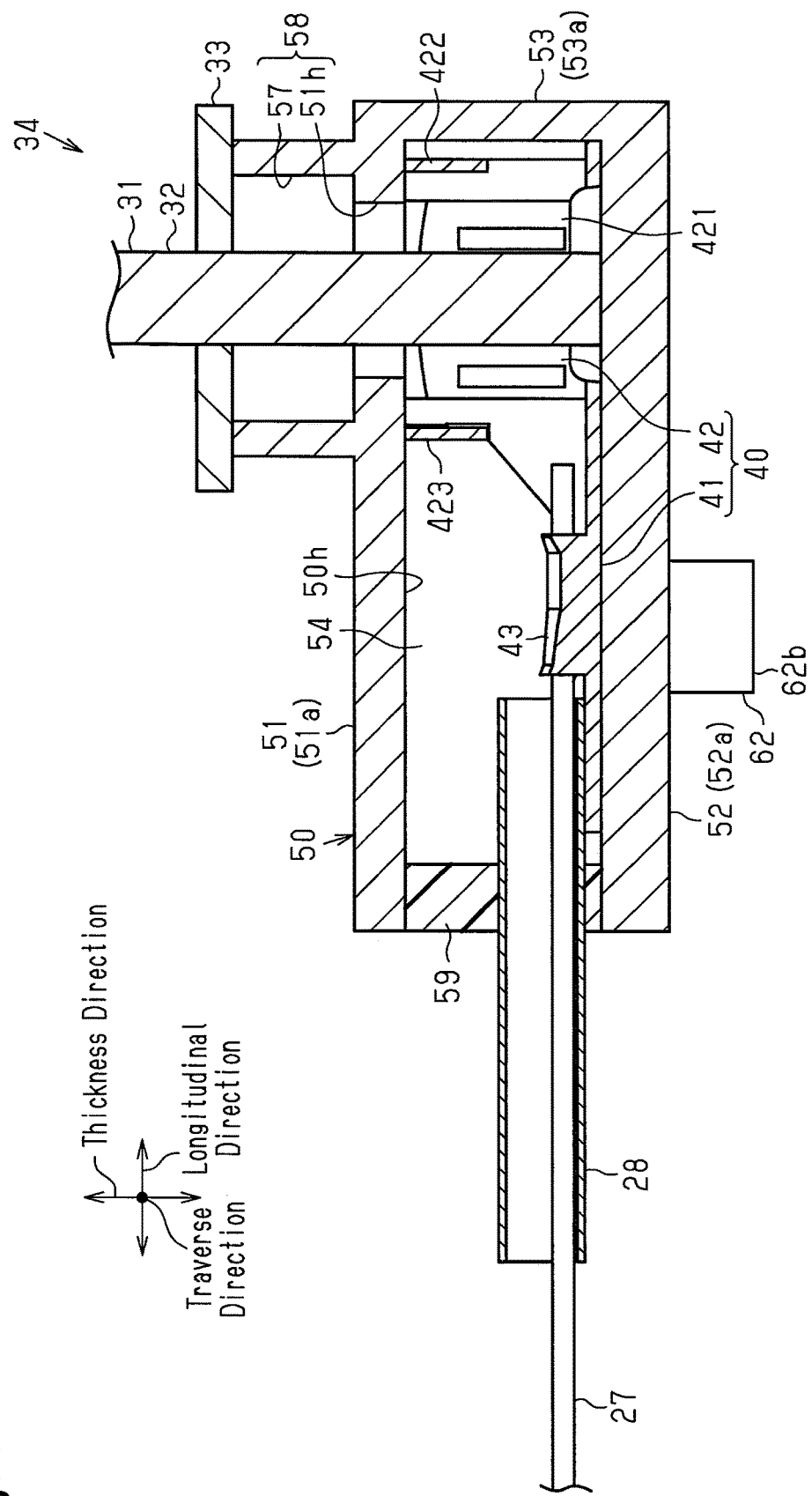

MOTOR-DRIVEN COMPRESSOR AND METHOD OF ASSEMBLING MOTOR-DRIVEN COMPRESSOR

BACKGROUND

1. Field

The present disclosure relates to a motor-driven compressor and a method of assembling a motor-driven compressor.

2. Description of Related Art

A motor-driven compressor includes a compression portion, which compresses fluid, and an electric motor, which drives the compression portion. The electric motor includes a stator. The stator includes a tubular stator core and a coil end, which protrudes from an end face in the axial direction of the stator core. The motor-driven compressor includes a housing. The housing has a tubular circumferential wall and an end wall, which is continuous with one end in the axial direction of the circumferential wall. The stator core is fixed to the inner circumferential surface of the circumferential wall. The end wall is lined up with the electric motor in the axial direction of the stator core. The motor-driven compressor includes a motor drive circuit, conductive members, motor wires, connection terminals, and a cluster block. The motor drive circuit drives the electric motor. The conductive members are electrically connected to the motor drive circuit via through-holes in the housing. The motor wires are routed out of the coil ends. The connection terminals connect the conductive members and the motor wires to each other. The cluster block has electrical insulating properties and accommodates the connection terminals. The cluster block also has conductive member insertion holes, into which the conductive members are inserted.

For example, Japanese Laid-Open Patent Publication No. 2018-168832 discloses a motor-driven compressor including a cluster block, which is disposed between an end wall of the housing and coil ends in the axial direction of the stator core. A part of the cluster block is opposed to the coil ends in the axial direction of the stator core. In this configuration, when the cluster block moves toward the electric motor in the axial direction of the stator core, movement of the cluster block in the housing is restricted by partially contacting the coil ends.

In the motor-driven compressor of the publication, the cluster block is not fixed in the housing. In this case, when the conductive members are pushed into the cluster block from the end wall of the housing to be connected to the connection terminals, the cluster block may be moved toward the electric motor. Thus, the cluster block may contact and damage the coil ends. Also, the cluster block may be deformed or broken.

SUMMARY

It is an objective of the present disclosure to provide a motor-driven compressor and a method of assembling a motor-driven compressor that limit contact between a cluster block and coil ends, and deformation and breakage of the cluster block when conductive members are connected to connection terminals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a motor-driven compressor is provided that includes a compression portion, an electric motor, a motor drive circuit, a conductive member, a motor wire, which is routed out of the coil end, a connection terminal, and a cluster block. The compression portion compresses fluid. The electric motor drives the compression portion and includes a stator. The stator includes a tubular stator core and a coil end, which protrudes from an end face in an axial direction of the stator core. The housing includes a circumferential wall, which includes an inner circumferential surface to which the stator core is fixed, and an end wall, which is continuous with an end in the axial direction of the circumferential wall and is lined up with the electric motor in the axial direction of the stator core. The motor drive circuit drives the electric motor. The conductive member is electrically connected to the motor drive circuit via a through-hole in the housing. The motor wire is routed out of the coil end. The connection terminal connects the conductive member and the motor wire to each other. The cluster block accommodates the connection terminal and includes a conductive member insertion hole, into which the conductive member is inserted. The cluster block is disposed between the end wall of the housing and the coil end in the axial direction of the stator core. When viewed in the axial direction of the stator core, the conductive member insertion hole is located on an outer side in a radial direction of the inner circumferential surface of the stator core. The cluster block includes a motor-side end face in the vicinity of the electric motor. The motor-side end face includes a pressed surface. When viewed in the axial direction of the stator core, the pressed surface is located on an inner side in the radial direction of the inner circumferential surface of the stator core. The cluster block includes a housing-side end face in the vicinity of the end wall of the housing. The housing-side end face includes a contact surface, which is lined up with the pressed surface in the axial direction of the stator core. The contact surface is allowed to contact the end wall of the housing.

In another general aspect, a method of assembling a motor-driven compressor. The motor-driven compressor includes a compression portion, an electric motor, a housing, a motor drive circuit, a conductive member, a connection terminal, and a cluster block. The compression portion compresses fluid. The electric motor drives the compression portion and includes a stator. The stator includes a tubular stator core and a coil end, which protrudes from an end face in an axial direction of the stator core. The housing includes a circumferential wall, which includes an inner circumferential surface to which the stator core is fixed, and an end wall, which is continuous with an end in the axial direction of the circumferential wall and is lined up with the electric motor in the axial direction of the stator core. The motor drive circuit drives the electric motor. The conductive member is electrically connected to the motor drive circuit via a through-hole in the housing. The motor wire is routed out of the coil end. The connection terminal connects the conductive member and the motor wire to each other. The cluster block accommodates the connection terminal and includes a conductive member insertion hole, into which the conductive member is inserted. The cluster block is disposed between the end wall of the housing and the coil end in the axial direction of the stator core. The method of assembling the motor-driven compressor includes: disposing the cluster block between the end wall of the housing and the coil end in the axial direction of the stator core such that, when viewed in the axial direction of the stator core, the conductive member insertion hole is located on an outer side in a radial direction of an inner circumferential surface of the stator core; pressing a part of the cluster block that is on an inner side in the radial direction of the inner circumferential surface of the stator core when viewed in the axial direction of the stator core toward the end wall of the housing from inside the stator core using a jig, thereby holding the cluster block with the jig and the end wall of the housing in a state in which a part of the cluster block that is located in the vicinity of the end wall of the housing and is lined up with a part pressed by the jig in the axial direction of the stator core is caused to contact the end wall of the housing; inserting the conductive member into the through-hole of the housing and the conductive member insertion hole of the cluster block in a state in which the cluster block is held with the jig and the end wall of the housing; and connecting the conductive member and the connection terminal to each other.

Other features and aspects will be apparent from the following detailed description, the drawings, and the claims.

BRIEF DESCRIPTION OF THE DRAWINGS

FIG. 4 is a cross-sectional view of the connector.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A motor-driven compressor 10 and a method of assembling the motor-driven compressor 10 according to an embodiment will now be described with reference to FIGS. 1 to 14.

Figure 1:
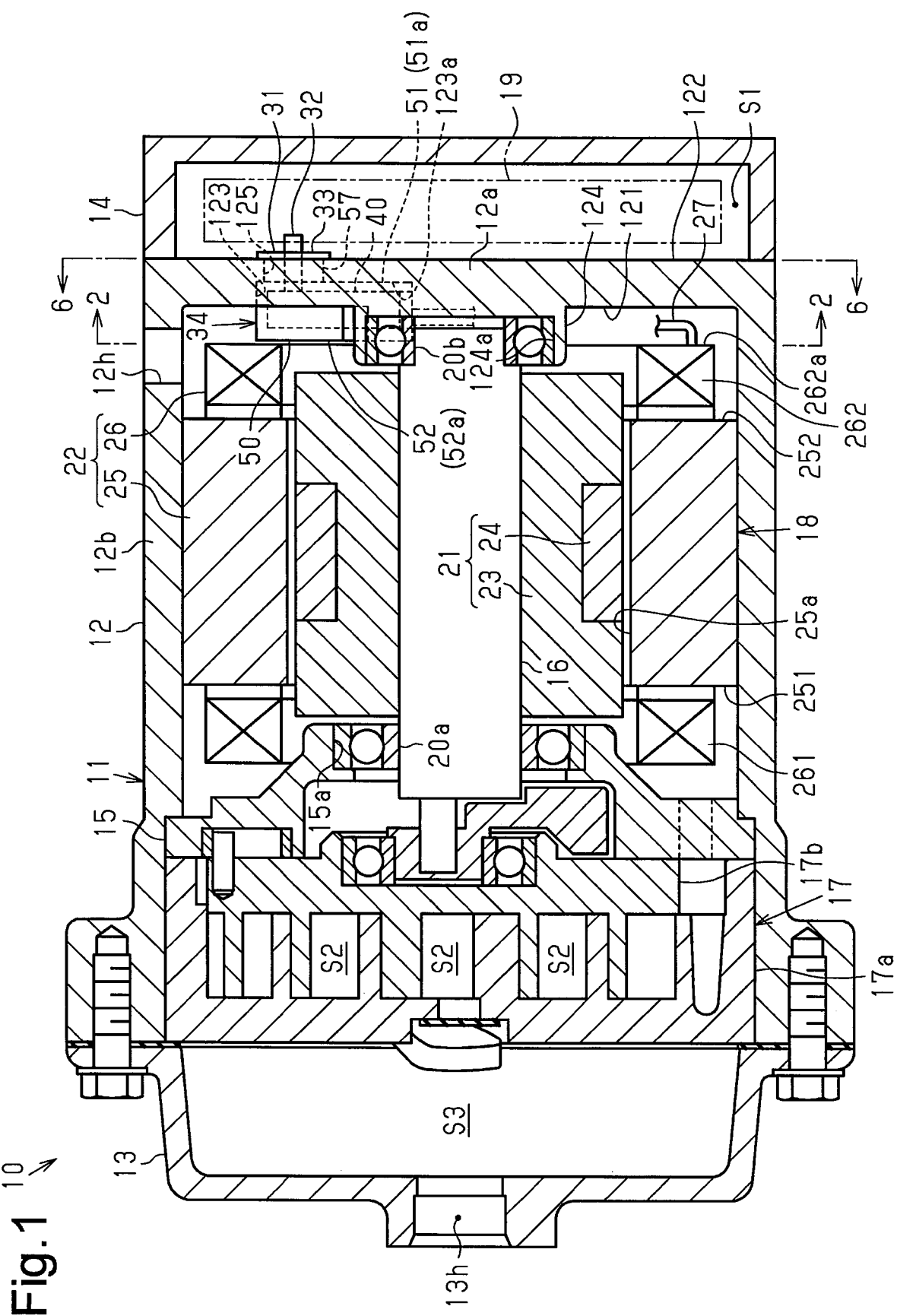
FIG. 1 is a cross-sectional side view of a motor-driven compressor.

As shown in FIG. 1, the motor-driven compressor 10 includes a housing 11. The housing 11 includes a tubular motor housing member 12 with a closed end. The motor housing member 12 includes a bottom wall 12a and a tubular circumferential wall 12b, which extends from the outer circumferential edge of the bottom wall 12a. The bottom wall 12a is an end wall that is continuous with an end in the axial direction of the circumferential wall 12b. The housing 11 includes a tubular discharge housing member 13 with a closed end and a tubular cover 14 with a closed end. The discharge housing member 13 is coupled to the opening side of the motor housing member 12. The cover 14 is coupled to the bottom wall 12a of the motor housing member 12. The bottom wall 12a of the motor housing member 12 and the cover 14 define an accommodation space S1.

The discharge housing member 13 has a discharge port 13h in the bottom wall. The discharge port 13h is connected to an external refrigerant circuit (not shown). The circumferential wall 12b of the motor housing member 12 has a suction port 12h. The suction port 12h is connected to the external refrigerant circuit.

The motor housing member 12 accommodates a rotary shaft 16, a compression portion 17, an electric motor 18. The compression portion 17 compresses refrigerant, which is fluid, by rotating the rotary shaft 16. The electric motor 18 rotates the rotary shaft 16 to drive the compression portion 17. The electric motor 18 is disposed closer to the bottom wall 12a of the motor housing member 12 than the compression portion 17. The accommodation space S1 accommodates a motor drive circuit 19, which drives the electric motor 18. In the present embodiment, the compression portion 17, the electric motor 18, and the motor drive circuit 19 are lined up in order in the axial direction of the rotary shaft 16.

The compression portion 17 includes a stationary scroll 17a, which is fixed in the motor housing member 12, and a movable scroll 17b, which is disposed to be opposed to the stationary scroll 17a. Compression chambers S2, the volume of which is variable, are defined between the stationary scroll 17a and the movable stationary scroll 17a. The stationary scroll 17a and the discharge housing member 13 define a discharge chamber S3. Changes in the volumes of the compression chambers S2 compress refrigerant, which is then discharged to the discharge chamber S3.

The electric motor 18 is constituted by a rotor 21, which rotates integrally with the rotary shaft 16, and a stator 22, which surrounds the rotor 21. The rotor 21 includes a cylindrical rotor core 23. The rotor core 23 is fixed to the rotary shaft 16. Permanent magnets 24 are embedded in the rotor core 23. The permanent magnet 24 are disposed at equal intervals in the circumferential direction of the rotor core 23.

The stator 22 includes a cylindrical stator core 25 and coils 26 of U, V and W phases provided on the stator core 25. The stator core 25 is fixed to the inner circumferential surface of the circumferential wall 12b of the motor housing member 12. The axial direction of the stator core 25 matches the axial direction of the rotary shaft 16. The stator core 25 has a first end face 251, from which first coil ends 261 of the respective phases protrude. The stator core 25 also has a second end face 252, from which second coil ends 262 of the respective phases protrude. The first coil ends 261 are located in the vicinity of the compression portion 17 in the axial direction of the rotary shaft 16. The second coil ends 262 are located in the vicinity of the motor drive circuit 19 in the axial direction of the rotary shaft 16. The second coil ends 262 each have a coil end face 262a on the side opposite to the second end face 252.

Two motor wires 27 are routed out of the second coil end 262 of each phase. The coils 26 of U, V, and W phases each have a double-wire structure in which two leads are wounded in order to reduce the voltage. FIG. 1 shows only one of the motor wires 27. The leads of the coils 26 are coated with insulating coating.

One of the opposite end faces of the bottom wall 12a of the motor housing member 12 that faces the electric motor 18 is defined as an inner surface 121, which is a motor-side wall surface. The end face opposite to the inner surface 121 is defined as an outer surface 122. An accommodating recess 123 is formed in the inner surface 121 of the bottom wall 12a. A boss 124 protrudes from the inner surface 121 of the bottom wall 12a toward the electric motor 18. The boss 124 has a bearing accommodating portion 124a at the distal end. The outer surface 122 of the bottom wall 12a is a flat surface.

Figure 2:
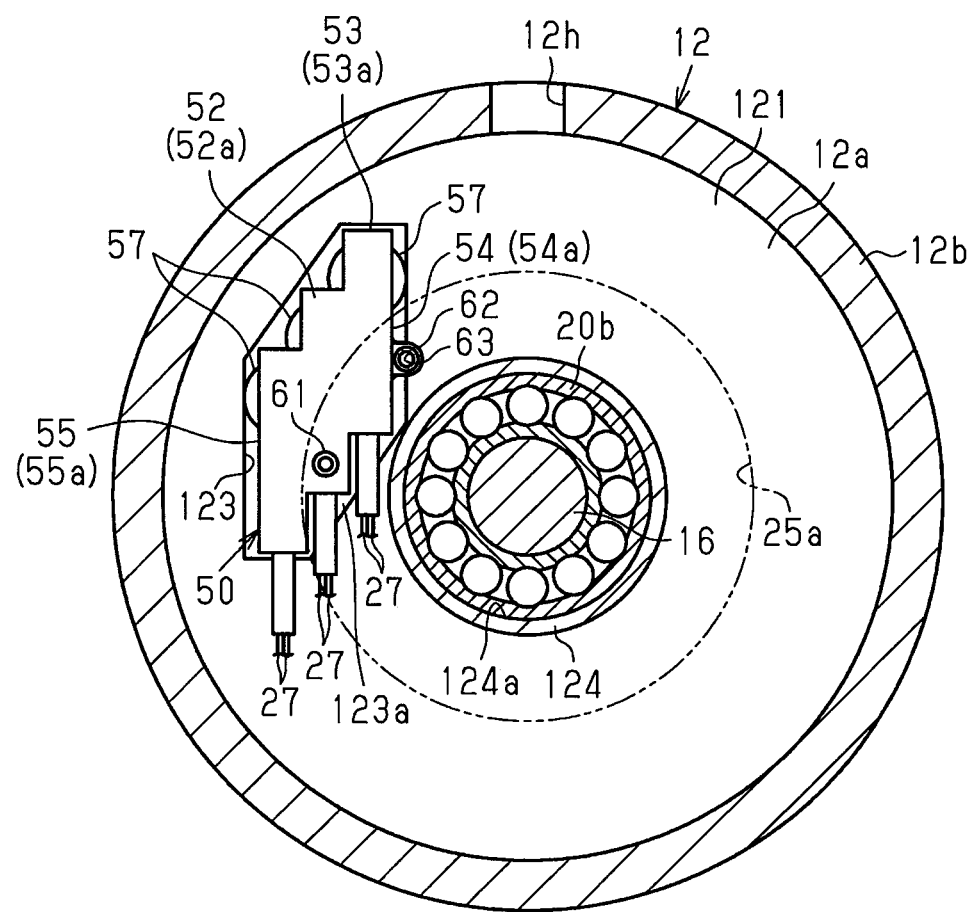
FIG. 2 is a cross-sectional view taken along line 2-2 in FIG. 1.

When viewed in the axial direction of the rotary shaft 16, the accommodating recess 123 includes a portion that is located on the outer side of an inner circumferential surface 25a of the stator core 25, which is shown by the long dashed double-short dashed line, as shown in FIG. 2. The accommodating recess 123 also has a portion located on the inner side of the inner circumferential surface 25a of the stator core 25.

As shown in FIG. 1, a shaft supporting member 15 is provided in the motor housing member 12. The shaft supporting member 15 is arranged between the electric motor 18 and the compression portion 17. The shaft supporting member 15 has an insertion hole 15a at the center, into which a first end of the rotary shaft 16 inserted. A radial bearing 20a is provided between the insertion hole 15a and the first end of the rotary shaft 16. The first end of the rotary shaft 16 is rotationally supported by the shaft supporting member 15 with the radial bearing 20a. A second end of the rotary shaft 16 is inserted into the bearing accommodating portion 124a. A radial bearing 20b is provided between the bearing accommodating portion 124a and the second end of the rotary shaft 16. The second end of the rotary shaft 16 is rotationally supported by the bearing accommodating portion 124a with the radial bearing 20b.

The motor-driven compressor 10 includes a hermetic terminal 31 accommodated in the housing 11. The hermetic terminal 31 includes three conductive members 32 and a support plate 33. The three conductive members 32 respectively correspond to the coils 26 of the U, V, and W phases. The support plates 33 supports the three conductive members 32 while insulating the conductive members 32 from each other. FIG. 1 shows only one of the conductive members 32. Each conductive member 32 is a columnar metal terminal that extends linearly. Each conductive member 32 has a first end that is electrically connected to the motor drive circuit 19 in the accommodation space S1. Each conductive member 32 has a second end that protrudes from the accommodation space S1 into the motor housing member 12 via a through-hole 125. The through-hole 125 is formed in the bottom surface 123a of the accommodating recess 123.

The motor housing member 12 accommodates a connector 34 that connects the motor wires 27 and the conductive members 32 to each other. The connector 34 is located between the electric motor 18 and the bottom wall 12a of the motor housing member 12 in the axial direction of the rotary shaft 16.

Figure 3:
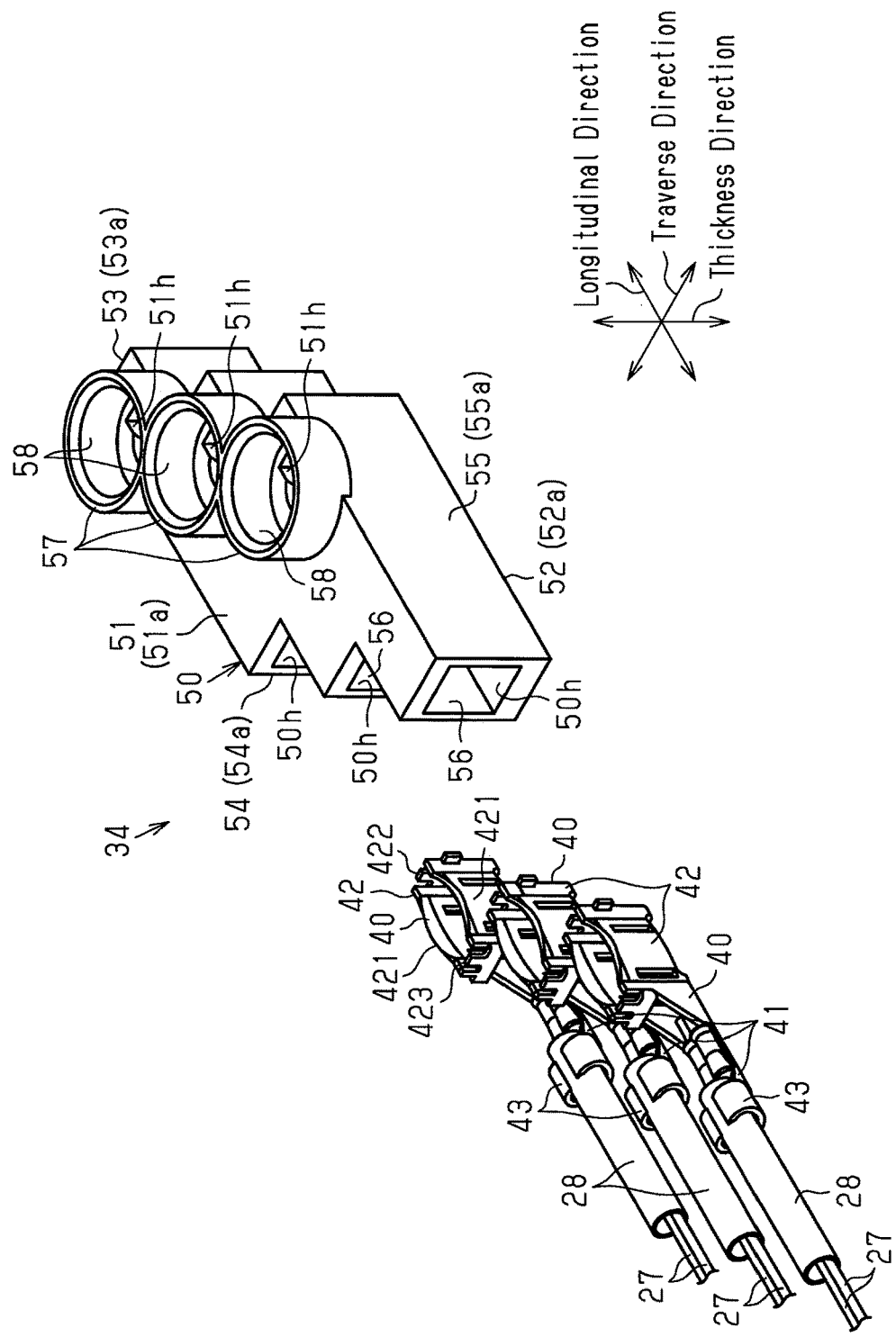
FIG. 3 is an exploded perspective view of a connector.

As shown in FIG. 3, the connector 34 has three connection terminals 40, which correspond to the coils 26 of the U, V, and W phases. The connector 34 also includes a cluster block 50, which accommodates the three connection terminals 40 and has electrical insulating properties.

As shown in FIGS. 3 and 4, each connection terminal 40 includes a first connection portion 41, which is electrically connected to the two motor wires 27 of the corresponding phase, and a second connection portion 42, which is connected to the corresponding conductive member 32. The first connection portion 41 extends linearly. The distal ends of the two motor wires 27 are connected to the first connection portion 41. The two motor wires 27 of each phase are covered with a tube member 28. The tube member 28 is cylindrical and has electrical insulating properties. The distal end of each motor wire 27 is not coated with the tube member 28, and the insulating coating is removed, so that the lead is exposed.

As shown in FIG. 3, each connection terminal 40 includes a crimp portion 43. The crimp portion 43 crimps an end of the tube member 28 closer to the first connection portion 41 and parts of the two motor wires 27 closer to the first connection portion 41. The crimp portion 43 extends from a first end of the first connection portion 41 in the vicinity of the tube member 28 to surround the tube member 28. Each set of the motor wires 27 is crimped by the corresponding crimp portion 43 while being inserted into the tube member 28 so as to be mechanically connected to the connection terminal 40.

The second connection portion 42 is continuous with a second end of the first connection portion 41 on the side opposite to the tube member 28. The second connection portion 42 has a rectangular tubular shape. The second connection portion 42 includes a pair of long side walls 421, a first short side wall 422, and a second short side wall 423. The long side walls 421 extend from the second end of the first connection portion 41. The first short side wall 422 bridges the ends of the long side walls 421 on one side in the longitudinal direction. The second short side wall 423 bridges the ends of the long side walls 421 on the other side in the longitudinal direction. The axis of the second connection portion 42 is orthogonal to the longitudinal direction of the first connection portion 41 and extends in the traverse direction of the long side walls 421. The second end of each conductive member 32 is inserted into the corresponding second connection portion 42.

The cluster block 50 includes first to fifth wall portions 51 to 55. The first wall portion 51 and the second wall portion 52 each include a pair of step-shaped edges and a pair of linearly extending edges. The third wall portion 53 connects one of the step-shaped edges of the first wall portion 51 to one of the step-shaped edges of the second wall portion 52. The fourth wall portion 54 connects one of the linearly extending edges of the first wall portion 51 to one of the linearly extending edges of the second wall portion 52. The fifth wall portion 55 connects the other one of the linearly extending edges of the first wall portion 51 to the other one of the linearly extending edges of the second wall portion 52. The direction in which the first wall portion 51 and the second wall portion 52 are opposed to each other is defined as a thickness direction of the cluster block 50, and the direction in which the fourth wall portion 54 and the fifth wall portion 55 are opposed to each other is defined as a traverse direction of the cluster block 50. The direction that is orthogonal to both of the thickness direction and the traverse direction of the cluster block 50 is defined as a longitudinal direction of the cluster block 50.

The cluster block 50 has in it three accommodating holes 50h. The three accommodating holes 50h are lined up in the traverse direction of the cluster block 50. Each accommodating hole 50h is separated from the other accommodating holes 50h by partition walls 56. Each accommodating hole 50h is narrow and deep and has an axis extending in the longitudinal direction of the cluster block 50. Each accommodating hole 50h opens in the side opposite to the third wall portion 53. Each accommodating hole 50h is rectangular when viewed from the side of the opening.

The cluster block 50 includes three through-portions 51h, which extend through the first wall portion 51, and three cylindrical guide portions 57. Each guide portion 57 protrudes from an outer surface 51a of the first wall portion 51. The through-portions 51h and the guide portions 57 are located in the vicinity of the third wall portion 53 in the longitudinal direction of the cluster block 50. The inside of each guide portion 57 communicates with the corresponding one of the through-portions 51h. Each through-portion 51h communicates with the corresponding one of the accommodating holes 50h.

As shown in FIG. 4, each connection terminal 40 is accommodated in the corresponding accommodating hole 50h. The direction in which the first connection portion 41 extends matches the longitudinal direction of the cluster block 50. The first connection portion 41 is located in the vicinity of the opening of the accommodating hole 50h in the longitudinal direction of the cluster block 50. The second connection portion 42 is located in the vicinity of the third wall portion 53 in the longitudinal direction of the cluster block 50. The axis of the second connection portion 42 extends in the thickness direction of the cluster block 50. The inside of the connection terminal 40 communicates with the through-portion 51h of the first wall portion 51 and with the inside of the guide portion 57 of the cluster block 50. The second end of the conductive member 32 is arranged inside the second connection portion 42 of the connection terminal 40 via the inside of the guide portion 57 and the through-portion 51h. The inner circumferential surface of the guide portion 57 and the through-portion 51h constitute a conductive member insertion hole 58, into which the conductive member 32 is inserted. As such, the cluster block 50 has three conductive member insertion holes 58. Parts of the cluster block 50 around the conductive member insertion holes 58 are weaker than the parts other than the conductive member insertion holes 58 and have lower stiffness and strength. The space at the opening of each accommodating hole 50h, that is, the space between the outer circumferential surface of the tube member 28 and the inner circumferential surface of the accommodating hole 50h is filled with plastic 59.

Figure 5A:
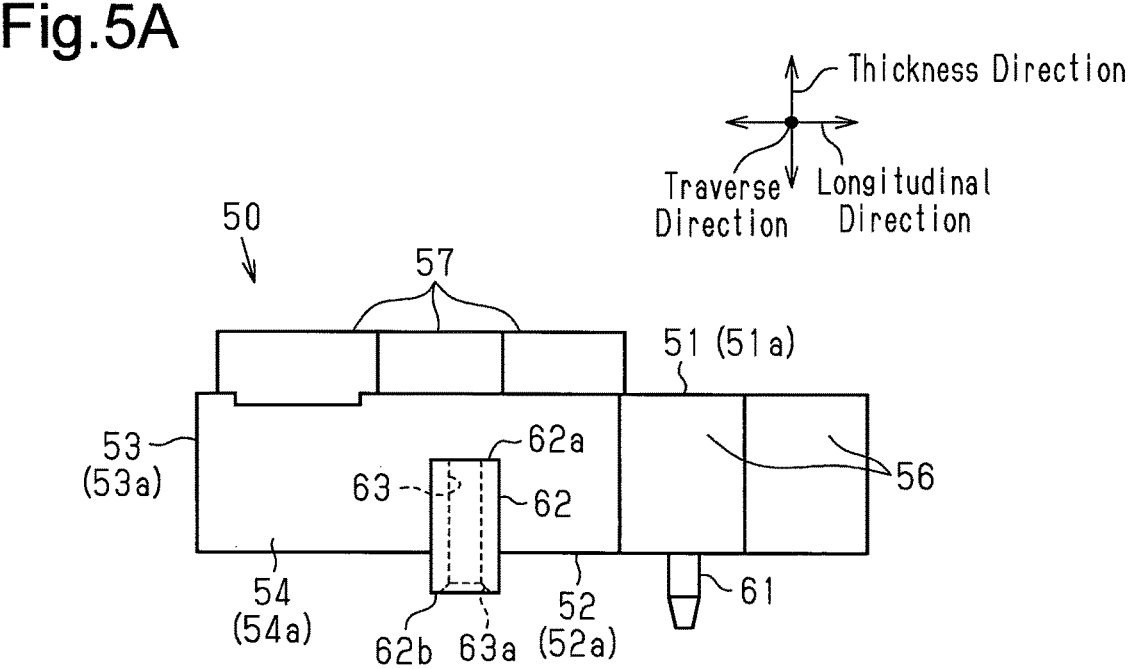
FIG. 5A is a side view of the cluster block.
Figure 5B:
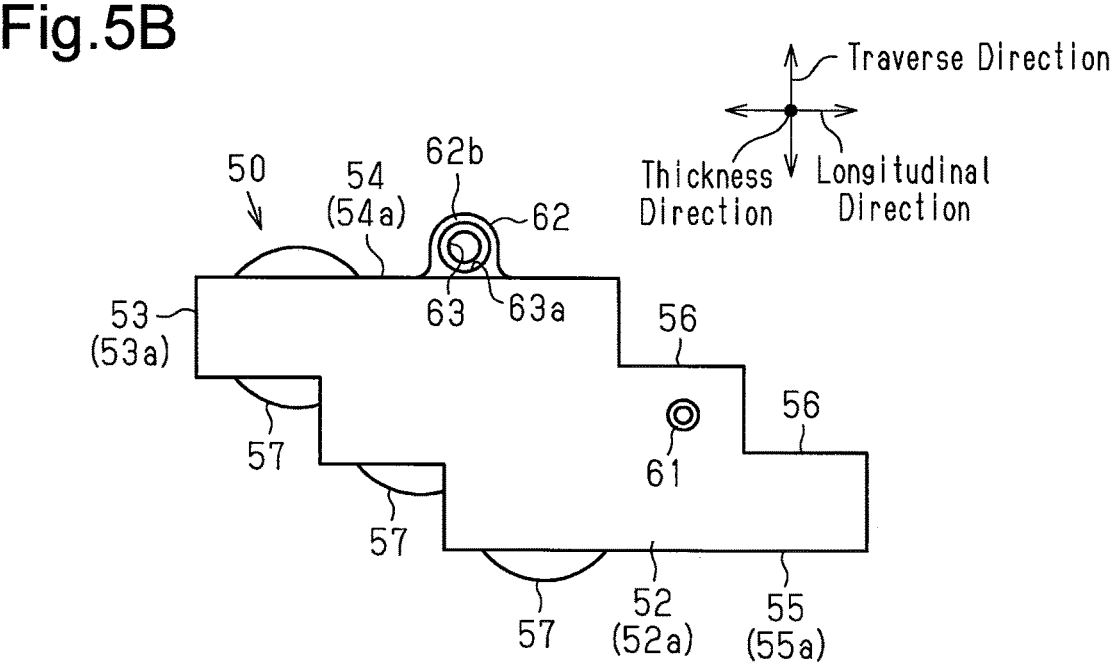
FIG. 5B is a bottom view of the cluster block.

As shown in FIGS. 5A and 5B, the cluster block 50 has a block-side pin 61, which is an engaging portion protruding from an outer surface 52a of the second wall portion 52. The block-side pin 61 is columnar. The distal end of the block-side pin 61 is tapered. That is, the outer diameter of the distal end of the block-side pin 61 decreases as the distance from the second wall portion 52 increases. The block-side pin 61 is located on the side opposite to the third wall portion 53 in the longitudinal direction of the cluster block 50. The block-side pin 61 is lined up with the center one of the three guide portions 57 in the longitudinal direction of the cluster block 50.

A protrusion 62 protrudes from an outer surface 54a of the fourth wall portion 54. The protrusion 62 has a first end face 62a on the side closer to the first wall portion 51. The first end face 62a is withdrawn with respect to the outer surface 51a of the first wall portion 51. The protrusion 62 also has a second end face 62b on the side closer to the second wall portion 52. The second end face 62b projects with respect to the outer surface 52a of the second wall portion 52. The protrusion 62 has a circular block-side insertion hole 63. The block-side insertion hole 63 extends through the protrusion 62 in the thickness direction of the cluster block 50. The part of the block-side insertion hole 63 in the vicinity of the second end face 62b includes a tapered surface 63a. The inner diameter of the block-side insertion hole 63 decreases from the second end face 62b toward the first end face 62a of the protrusion 62.

As shown in FIG. 1, the cluster block 50 is arranged between the bottom wall 12a of the motor housing member 12 and the electric motor 18 in the axial direction of the rotary shaft 16. The thickness direction of the cluster block 50 matches the axial direction of the rotary shaft 16. In this case, the outer surface 51a of the first wall portion 51 of the cluster block 50 is located in the vicinity of the bottom wall 12a of the motor housing member 12, and the outer surface 52a of the second wall portion 52 is located in the vicinity of the electric motor 18. Thus, the outer surface 51a of the first wall portion 51 of the cluster block 50 is defined as a housing-side end face, which is located in the vicinity of the bottom wall 12a of the motor housing member 12. Also, the outer surface 52a of the second wall portion 52 of the cluster block 50 is defined as a motor-side end face, which is located in the vicinity of the electric motor 18. The outer surfaces 53a to 55a of third to fifth wall portions 53 to 55 are defined as side surfaces connecting the outer surface 51a of the first wall portion 51 to the outer surface 52a of the second wall portion 52.

Figure 6:
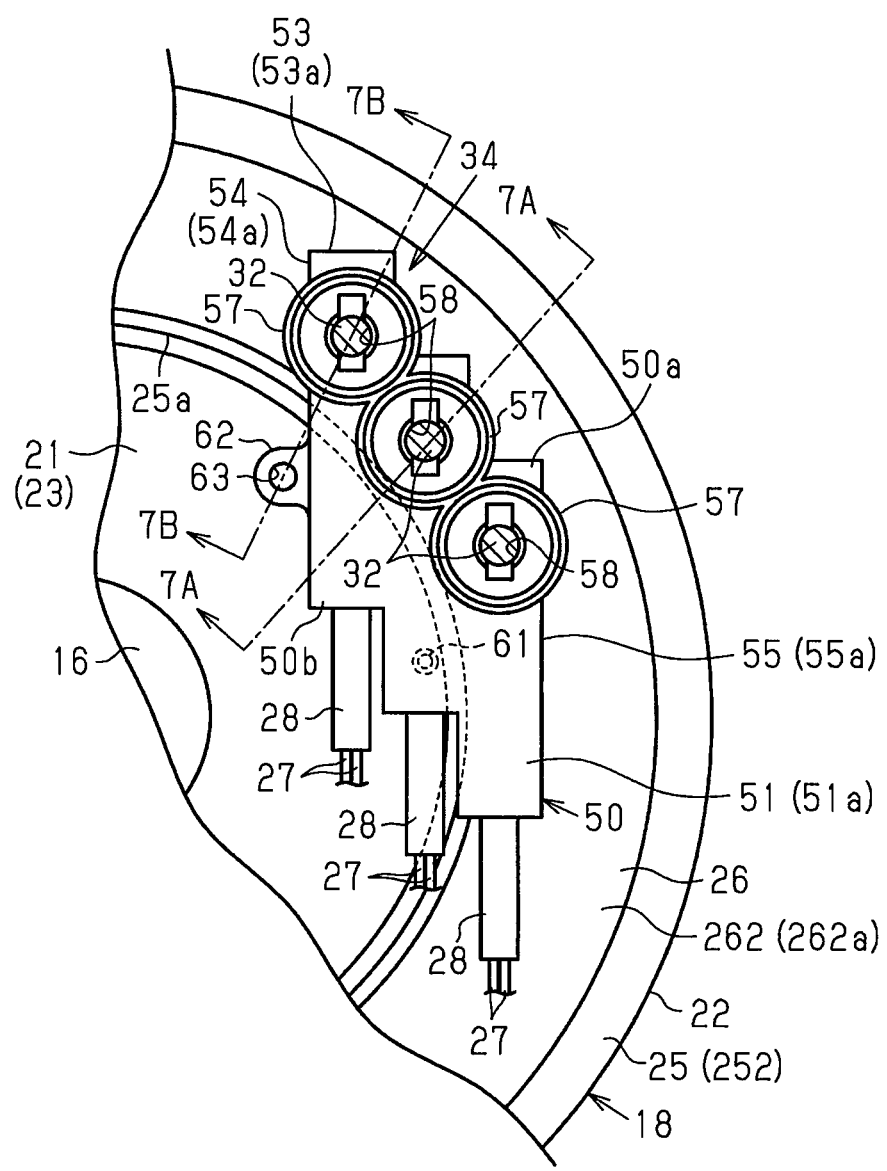
FIG. 6 is a cross-sectional view taken along line 6-6 in FIG. 1.

When viewed in the axial direction of the stator core 25, the cluster block 50 includes a radially outer portion 50a, which is located on the outer side of the inner circumferential surface 25a of the stator core 25, as shown in FIG. 6. The cluster block 50 also has a radially inner portion 50b, which is located on the inner side of the inner circumferential surface 25a of the stator core 25. The motor housing member 12 is omitted in FIG. 6. The radially outer portion 50a includes a part of the first wall portion 51, a part of the second wall portion 52, the third wall portion 53, a part of the fourth wall portion 54, and the fifth wall portion 55 of the cluster block 50. The radially outer portion 50a includes the conductive member insertion holes 58. The radially inner portion 50b includes a part of the first wall portion 51, a part of the second wall portion 52, and a part of the fourth wall portion 54 of the cluster block 50. The radially inner portion 50b includes the block-side pin 61 and the protrusion 62. The radially outer portion 50a is lined up with the second coil ends 262 in the axial direction of the rotary shaft 16. The radially inner portion 50b is lined up with the rotor 21 in the axial direction of the rotary shaft 16.

Figure 7A:
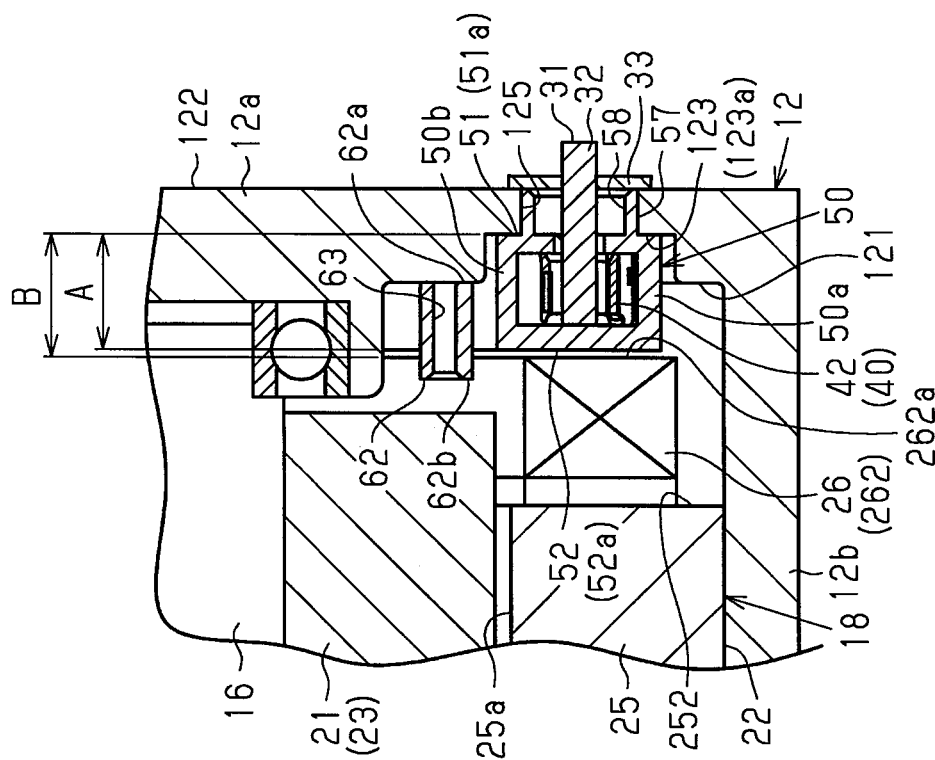
FIG. 7A is a cross-sectional view taken along line 7A-7A in FIG. 6.
Figure 7B:
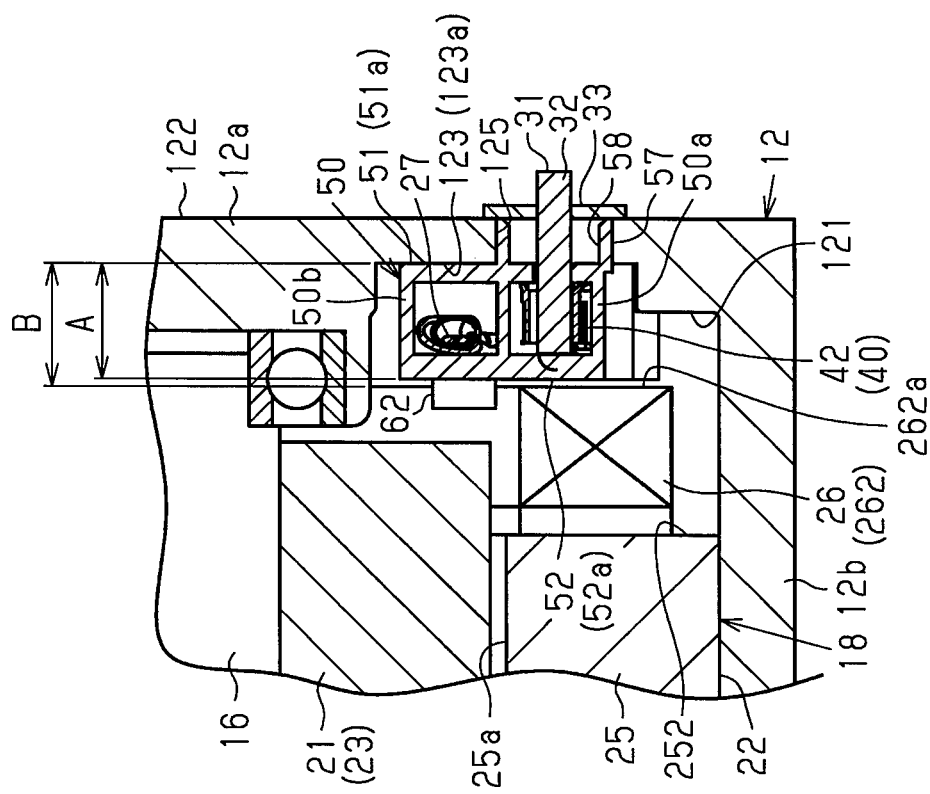
FIG. 7B is a cross-sectional view taken along line 7B-7B in FIG. 6.

As shown in FIG. 7A, the outer surface 51a of the first wall portion 51 is allowed to contact the bottom surface 123a of the accommodating recess 123. As shown in FIG. 7B, the first end face 62a of the protrusion 62 is allowed to contact the inner surface 121 of the bottom wall 12a. Thus, a part of the inner surface 121 of the bottom wall 12a that is opposed to the first end face 62a of the protrusion 62 projects with respect to the bottom surface 123a of the accommodating recess 123. The guide portions 57 of the cluster block 50 are inserted into the through-hole 125 of the bottom wall 12a of the motor housing member 12. This determines the position of the conductive member insertion holes 58 of the cluster block 50 in relation to the through-hole 125 of the bottom wall 12a.

The distance between the outer surface 51a of the first wall portion 51 and the outer surface 52a of the second wall portion 52 is defined as a dimension A in the thickness direction of the cluster block 50. The dimension A in the thickness direction of the cluster block 50 is less than a distance B between the bottom wall 12a and the second coil ends 262 in the axial direction of the rotary shaft 16. In the present embodiment, the distance B between the bottom wall 12a and the second coil ends 262 is the distance between the bottom surface 123a of the accommodating recess 123 of the bottom wall 12a and coil end faces 262a of the second coil ends 262.

A pressing jig 70 used to assemble the motor-driven compressor 10 will now be described.

Figure 8:
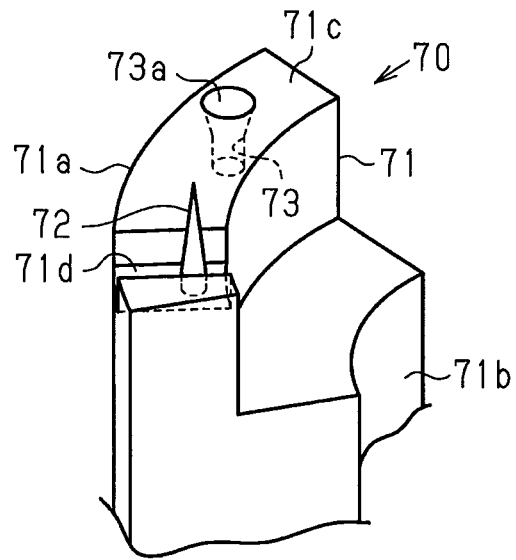
FIG. 8 is a perspective view of a pressing jig.

As shown in FIG. 8, the pressing jig 70 includes a body 71. The body 71 has an outer-side curved surface 71a, which has the same shape as the inner circumferential surface 25a of the stator core 25. The body 71 also has an inner-side curved surface 71b, which makes a pair with the outer-side curved surface 71a and has a concave shape recessed toward the outer-side curved surface 71a. The body 71 also has a connecting surface 71c, which connects the outer-side curved surface 71a and the inner-side curved surface 71b to each other in the radial direction. A part of the connecting surface 71c that is in the vicinity of the inner-side curved surface 71b is withdrawn with respect to a part in the vicinity of the outer-side curved surface 71a, so that the connecting surface 71c has a shape of a step. The higher part of the connecting surface 71c, which is in the vicinity of the outer-side curved surface 71a, has an escape portion 71d, which is a recess. The escape portion 71d receives a part of the protrusion 62 that protrudes more than the outer surface 52a of the second wall portion 52 of the cluster block 50.

The pressing jig 70 includes a jig-side pin 72, which protrudes from the bottom surface of the escape portion 71d. The jig-side pin 72 has a tapered conical shape. That is, the outer diameter of the jig-side pin 72 decreases as the distance from the connecting surface 71c increases. The outer diameter of the jig-side pin 72 is set such that the jig-side pin 72 is allowed to be inserted into the block-side insertion hole 63 of the cluster block 50. The connecting surface 71c of the body 71 has a circular jig-side insertion hole 73. A part of the jig-side insertion hole 73 close to the opening is a tapered surface 73a. That is, the inner diameter of the jig-side insertion hole 73 decreases from the opening toward the bottom. The inner diameter of the jig-side insertion hole 73 is set such that the block-side pin 61 of the cluster block 50 is allowed to be inserted into the jig-side insertion hole 73. The shortest distance between the jig-side pin 72 and the jig-side insertion hole 73 along the connecting surface 71c of the pressing jig 70 is substantially equal to the shortest distance between the block-side pin 61 and the block-side insertion hole 63 along the outer surface 52a of the second wall portion 52 of the cluster block 50.

The method of assembling the motor-driven compressor 10 will now be described together with the operation of the present embodiment.

Figure 9:
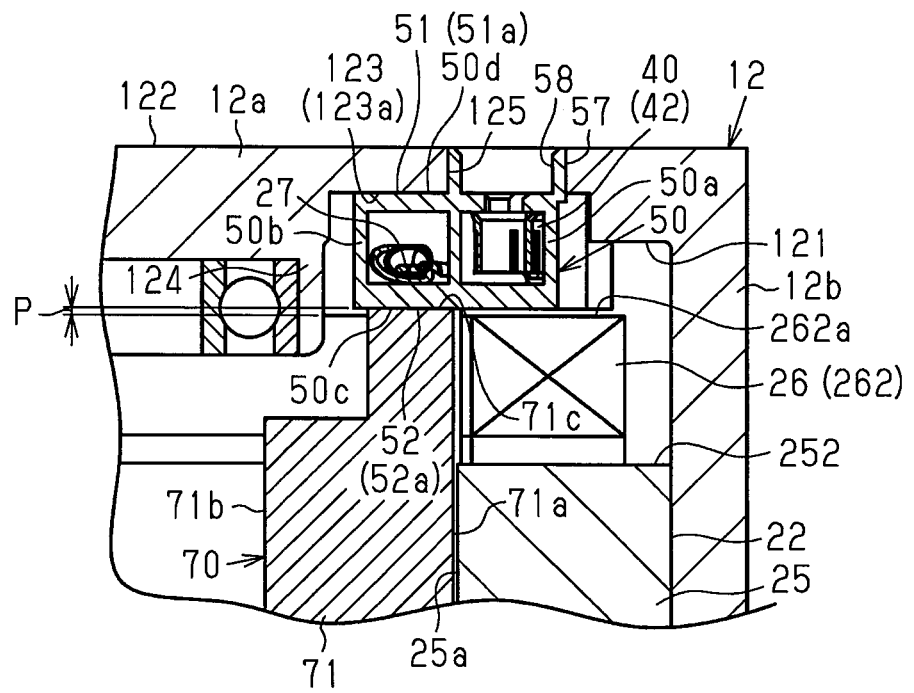
FIG. 9 is a cross-sectional view showing a method of assembling a motor-driven compressor.
Figure 10:
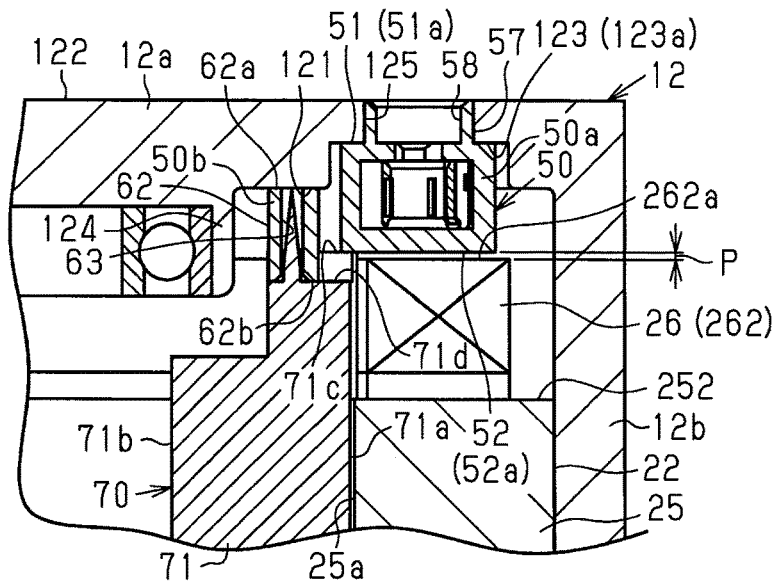
FIG. 10 is a cross-sectional view showing the method of assembling the motor-driven compressor.

As shown in FIGS. 9 and 10, the cluster block 50 is arranged between the bottom wall 12a of the motor housing member 12 and the second coil ends 262. At this time, when viewed in the axial direction of the stator core 25, the cluster block 50 is arranged such that the conductive member insertion holes 58 are located on the radially outer side of the inner circumferential surface 25a of the stator core 25. That is, when viewed in the axial direction of the stator core 25, the cluster block 50 includes the radially outer portion 50a, which is located on the outer side of the inner circumferential surface 25a of the stator core 25. The cluster block 50 also has the radially inner portion 50b, which is located on the inner side of the inner circumferential surface 25a of the stator core 25.

Figure 11:
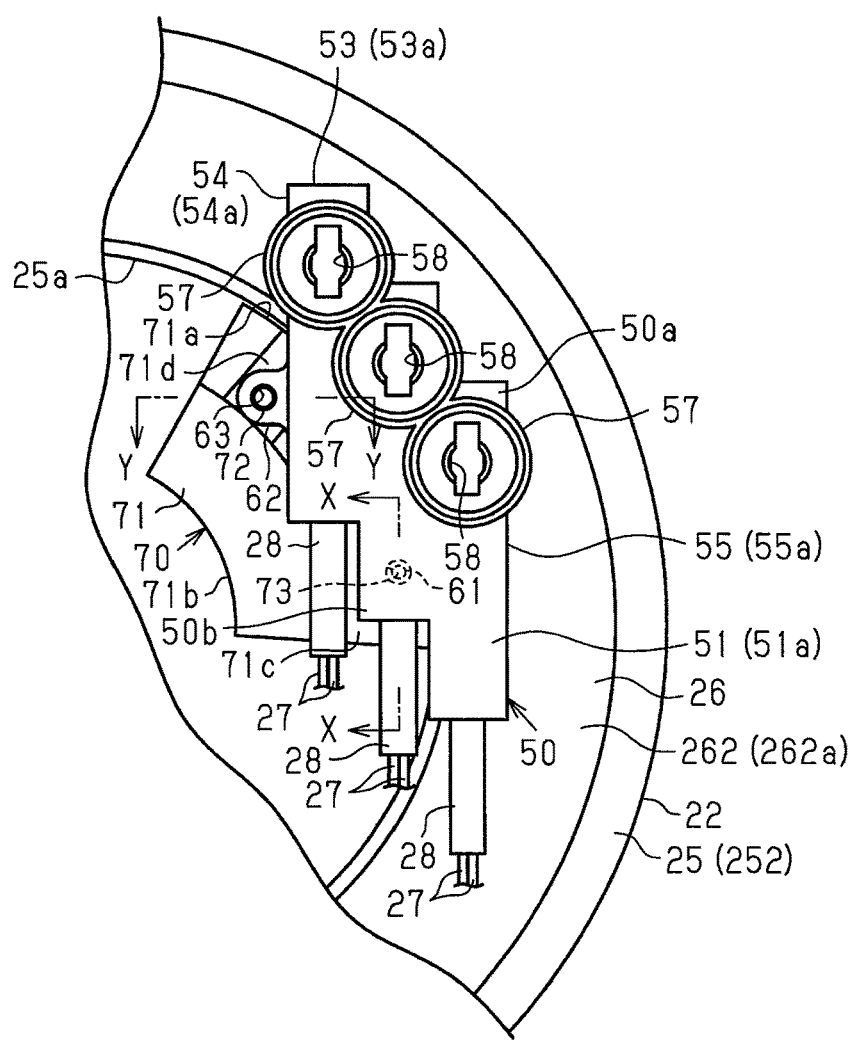
FIG. 11 is a rear view showing the method of assembling the motor-driven compressor.

As shown in FIGS. 9 to 11, the body 71 of the pressing jig 70 is inserted into the stator core 25 from the connecting surface 71c in a state in which the cluster block 50 is arranged between the bottom wall 12a of the motor housing member 12 and the second coil ends 262. In this state, the pressing jig 70 is used to press the cluster block 50 toward the bottom wall 12a of the motor housing member 12. At this time, the outer-side curved surface 71a of the body 71 is opposed to the inner circumferential surface 25a of the stator core 25. The motor housing member 12 is omitted in FIG. 11 for the illustrative purposes.

Figure 12:
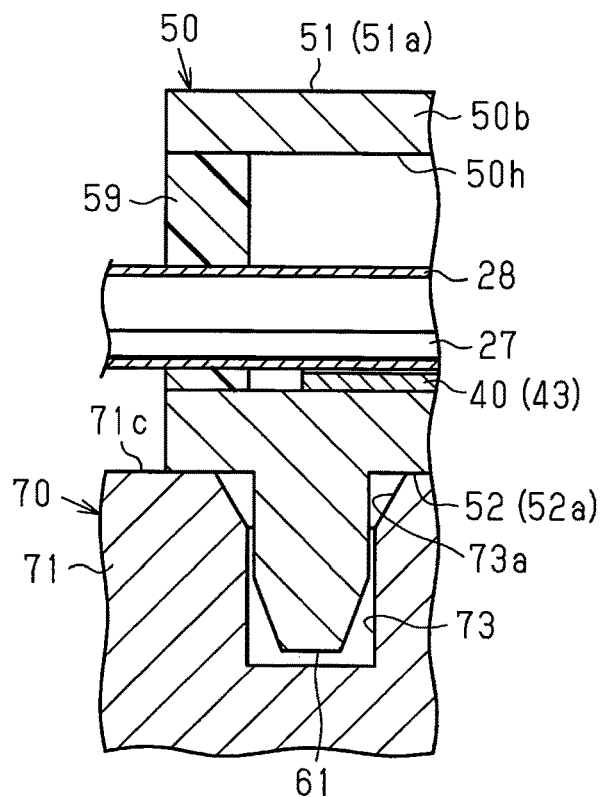
FIG. 12 is a cross-sectional view taken along line 12-12 in FIG. 11.
Figure 13:
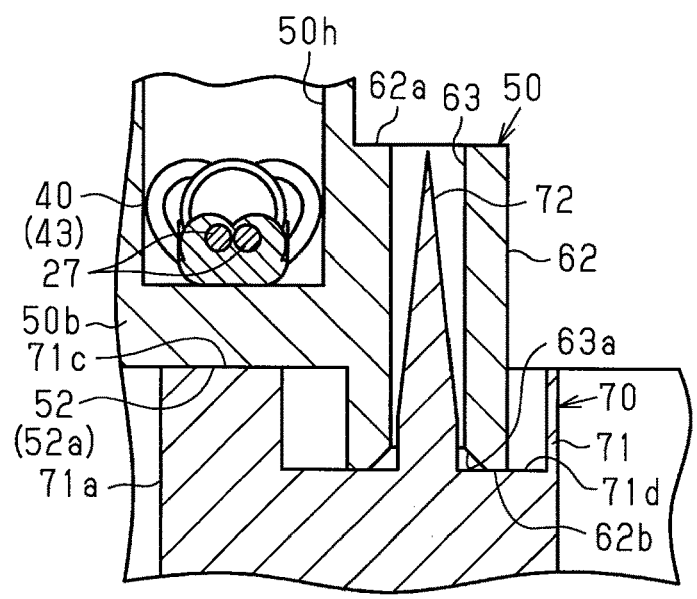
FIG. 13 is a cross-sectional view taken along line 13-13 in FIG. 11.
Figure 14:
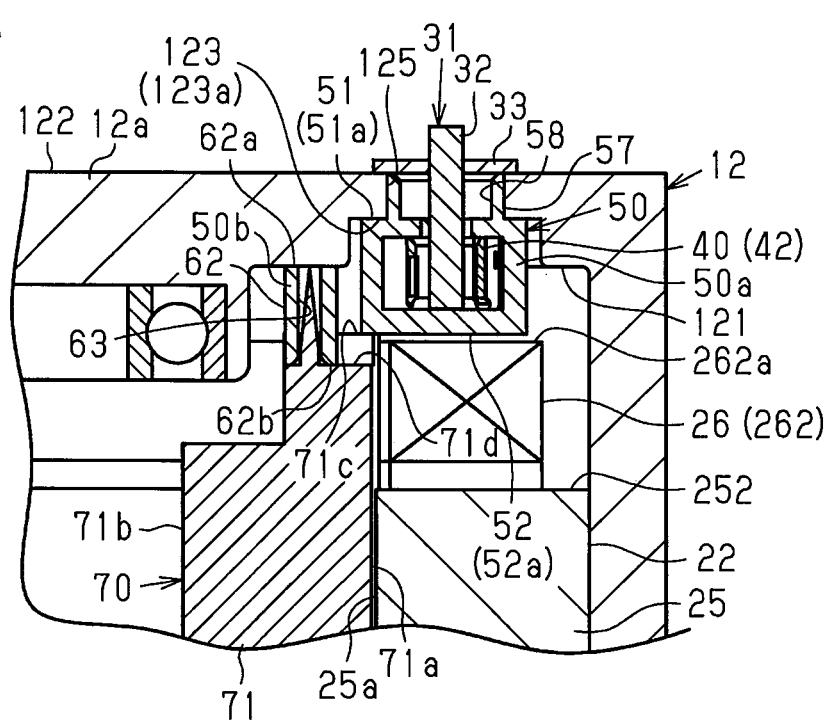
FIG. 14 is a cross-sectional view showing the method of assembling the motor-driven compressor.

When inserting the pressing jig 70, the block-side pin 61 of the cluster block 50 is first inserted into the jig-side insertion hole 73 of the pressing jig 70 as shown FIGS. 12 and 13. That is, the block-side pin 61 of the cluster block 50 is engaged with the jig-side insertion hole 73 of the pressing jig 70. Thus, the block-side pin 61 is an engaging portion that is engaged with the pressing jig 70.

Also, the block-side pin 61 is inserted into the jig-side insertion hole 73. Simultaneously, a part of the protrusion 62 that protrudes further than the outer surface 52a of the second wall portion 52 is inserted into the escape portion 71d of the pressing jig 70, and the jig-side pin 72 is inserted into the block-side insertion hole 63 of the protrusion 62. That is, the jig-side pin 72 of the pressing jig 70 is engaged with the block-side insertion hole 63 of the cluster block 50. Thus, the block-side insertion hole 63 is an engaging portion that is engaged with the pressing jig 70. As such, the cluster block 50 has two engaging portions.

When the pressing jig 70 is inserted further, a part of the connecting surface 71c of the body 71 that is in the vicinity of the outer-side curved surface 71a presses a part of the outer surface 52a of the second wall portion 52 of the cluster block 50 that constitutes the radially inner portion 50b as shown in FIG. 9. Thus, the outer surface 52a of the second wall portion 52 has a pressed surface 50c, which is pressed by the pressing jig 70, at a part that constitutes the radially inner portion 50b. As shown in FIG. 10, the bottom surface of the escape portion 71d of the body 71 presses the second end face 62b of the protrusion 62. Since a part of the connecting surface 71c of the body 71 that is in the vicinity of the inner-side curved surface 71b is withdrawn with respect to a part in the vicinity of the outer-side curved surface 71a, the body 71 and the boss 124 do not interfere with each other.

When the pressing jig 70 is inserted further, the entire outer surface 51a of the first wall portion 51 of the cluster block 50 contacts the bottom surface 123a of the accommodating recess 123 as shown in FIG. 9. The outer surface 51a of the first wall portion 51 includes a contact surface 50d at a part that constitutes the radially inner portion 50b. The contact surface 50d is lined up with the pressed surface 50c in the thickness direction of the cluster block 50 and is allowed to contact the bottom surface 123a of the accommodating recess 123. As shown in FIG. 10, the first end face 62a of the protrusion 62 contacts the inner surface 121 of the bottom wall 12a. Accordingly, the cluster block 50 is held between the body 71 of the pressing jig 70 and the bottom wall 12a of the motor housing member 12 in the axial direction of the stator core 25. The part of the outer surface 52a of the second wall portion 52 of the cluster block 50 that constitutes the radially outer portion 50a is separated from the coil end faces 262a of the second coil ends 262 by a distance P. Thus, a clearance P exists between the part of the outer surface 52a of the second wall portion 52 of the cluster block 50 that constitutes the radially outer portion 50a and the coil end faces 262a of the second coil ends 262.

Next, in a state in which the cluster block 50 is held between the pressing jig 70 and the bottom wall 12a of the motor housing member 12, the connection terminals 40 are connected to the conductive members 32. Specifically, the conductive members 32, which are passed through the conductive member insertion holes 58 from the outer surface 122 of the bottom wall 12a, are inserted into the second connection portions 42 of the connection terminals 40. At this time, the cluster block 50 is held between the pressing jig 70 and the bottom wall 12a of the motor housing member 12. Thus, when the conductive members 32 are connected to the connection terminals 40, the pressing jig 70 restricts movement of the cluster block 50 toward the stator 22 in the axial direction of the stator core 25. Also, the pressed surface 50c and the contact surface 50d of the cluster block 50 are lined up in the axial direction of the stator core 25. Accordingly, since the cluster block 50 is held between the pressing jig 70 and the bottom wall 12a of the motor housing member 12, the outer surfaces 51a, 52a of the first wall portion 51 and the second wall portion 52 of the cluster block 50 are not tilted relative to the direction orthogonal to the axial direction of the stator core 25. The cluster block 50 thus does not approach the second coil ends 262. This allows the conductive members 32 to be connected to the connection terminals 40 without bringing the cluster block 50 into contact with the second coil ends 262.

Further, the conductive member insertion holes 58 are located on the radially outer side of the inner circumferential surface 25a of the stator core 25. In other words, the conductive member insertion holes 58 are not located in a portion of the cluster block 50 that is held between the pressing jig 70 and the bottom wall 12a of the motor housing member 12. Thus, when the cluster block 50 is held between the pressing jig 70 and the bottom wall 12a of the motor housing member 12, stress is not concentrated in the part surrounding the conductive member insertion holes 58, which is a weak portion of the cluster block 50. The cluster block 50 is therefore prevented from being deformed or broken.

The present embodiment has the following advantages.

(1) In a state in which the cluster block 50 is arranged between the bottom wall 12a of the motor housing member 12 and the second coil ends 262 of the stator 22, the pressing jig 70 is used to press the pressed surface 50c of the cluster block 50 toward the bottom wall 12a of the motor housing member 12 from inside the stator core 25. Accordingly, in a state in which the outer surface M a of the first wall portion 51 of the cluster block 50 contacts the bottom surface 123a of the accommodating recess 123 of the motor housing member 12, the cluster block 50 is held between the pressing jig 70 and the bottom wall 12a of the motor housing member 12. In this state, the conductive members 32 are connected to the connection terminals 40, so that the pressing jig 70 restricts movement of the cluster block 50 toward the stator 22 in the axial direction of the stator core 25.

Also, the pressed surface 50c and the contact surface 50d are lined up in the axial direction of the stator core 25. Accordingly, since the cluster block 50 is held between the pressing jig 70 and the bottom wall 12a of the motor housing member 12, the outer surfaces 51a, 52a of the first wall portion 51 and the second wall portion 52 of the cluster block 50 are not tilted relative to the direction orthogonal to the axial direction of the stator core 25. The cluster block 50 thus does not approach the second coil ends 262. This allows the conductive members 32 to be connected to the connection terminals 40 without bringing the cluster block 50 into contact with the second coil ends 262.

Further, the conductive member insertion holes 58 are located on the radially outer side of the inner circumferential surface 25a of the stator core 25. In other words, the conductive member insertion holes 58 are not located in a portion of the cluster block 50 that is held between the pressing jig 70 and the bottom wall 12a of the motor housing member 12. Thus, when the cluster block 50 is held between the pressing jig 70 and the bottom wall 12a of the motor housing member 12, stress is not concentrated in the part surrounding the conductive member insertion holes 58, which is a weak portion of the cluster block 50. Therefore, the cluster block 50 is not deformed or broken when the cluster block 50 is held between the pressing jig 70 and the bottom wall 12a of the motor housing member 12.

(2) The cluster block 50 has the block-side pin 61. The block-side pin 61 protrudes from a portion of the outer surface 52a of the second wall portion 52 that constitutes the radially inner portion 50b. The block-side pin 61 is inserted into the jig-side insertion hole 73, which is formed in the connecting surface 71c of the body 71 of the pressing jig 70. This determines the position of the cluster block 50 in relation to the pressing jig 70. Accordingly, when the cluster block 50 is held between the pressing jig 70 and the bottom wall 12a of the motor housing member 12, the cluster block 50 is restricted from moving relative to the pressing jig 70 in the direction orthogonal to the axial direction of the stator core 25.

(3) The cluster block 50 has the protrusion 62. The protrusion 62 protrudes from a portion of the outer surface 54a of the fourth wall portion 54 that constitutes the radially inner portion 50b. Also, the protrusion 62 has the block-side insertion hole 63, which extends through the protrusion 62 in the axial direction of the stator core 25. Thus, when the jig-side pin 72 of the pressing jig 70 is inserted into the block-side insertion hole 63, the position of the cluster block 50 relative to the pressing jig 70 is determined. Accordingly, when the cluster block 50 is held between the pressing jig 70 and the bottom wall 12a of the motor housing member 12, the cluster block 50 is restricted from moving relative to the pressing jig 70 in the direction orthogonal to the axial direction of the stator core 25.

(4) If the cluster block 50 includes, for example, only the block-side pin 61, the cluster block 50 may rotate in relation to the pressing jig 70 about the block-side pin 61. Likewise, if the cluster block 50 includes only the protrusion 62, the cluster block 50 may rotate in relation to the pressing jig 70 about the jig-side pin 72. However, the cluster block 50 has two engaging portions, which are the block-side pin 61 and the block-side insertion hole 63. This prevents the cluster block 50 from rotating relative to the pressing jig 70. Accordingly, when the cluster block 50 is held between the pressing jig 70 and the bottom wall 12a of the motor housing member 12, the cluster block 50 is restricted from moving in the direction orthogonal to the axial direction of the stator core 25.

(5) The inner surface 121 of the bottom wall 12a includes the accommodating recess 123, which accommodates a part of the cluster block 50. This allows the size of the motor-driven compressor 10 to be reduced in the axial direction of the stator core 25 as compared with a case in which the cluster block 50 is arranged between the inner surface 121 of the bottom wall 12a without the accommodating recess 123 and the end faces 262a of the second coil ends 262.

(6) High-pressure refrigerant flows in the housing 11 of the motor-driven compressor 10. The housing 11 is thus required to have a strength withstanding high pressure. It is thus preferable to increase the thickness of the housing 11 as much as possible.

For example, in a case in which the first end face 62a of the protrusion 62 is flush with the outer surface 51a of the first wall portion 51, the accommodating recess 123 needs to be formed in a part of the inner surface 121 of the bottom wall 12a that is opposed to the first end face 62a of the protrusion 62 in order to accommodate a part of the cluster block 50 in the thickness direction in the accommodating recess 123 of the motor housing member 12. In this case, the thickness of the bottom wall 12a of the motor housing member 12 is the same between the portion that is opposed to the protrusion 62 and the portion in which the accommodating recess 123 is formed.

In contrast, the first end face 62a of the protrusion 62 is withdrawn with respect to the outer surface 51a of the first wall portion 51. Thus, a part of the cluster block 50 can be accommodated in the accommodating recess 123 without forming the accommodating recess 123 in a portion of the inner surface 121 of the bottom wall 12a that is opposed to the first end face 62a of the protrusion 62. That is, the part of the inner surface 121 of the bottom wall 12a that is opposed to the first end face 62a of the protrusion 62 is allowed to project with respect to the bottom surface 123a of the accommodating recess 123. Thus, in the part opposed to the first end face 62a of the protrusion 62, the thickness of the bottom wall 12a in the axial direction of the stator core 25 is allowed to be greater than that of the part where the accommodating recess 123 is formed. As a result, the size of the motor-driven compressor 10 is reduced in the axial direction of the stator core 25 without reducing the strength of the housing 11.

(7) The distal end of the block-side pin 61 is tapered. This allows the block-side pin 61 to be easily inserted into the jig-side insertion hole 73 of the pressing jig 70.

(8) The part of the jig-side insertion hole 73 close to the opening is the tapered surface 73a, so that the inner diameter decreases from the opening toward the bottom. This allows the block-side pin 61 to be easily inserted into the jig-side insertion hole 73 of the pressing jig 70.

(9) The jig-side pin 72 of the pressing jig 70 is tapered toward the distal end. This allows the jig-side pin 72 to be easily inserted into the block-side insertion hole 63 of the protrusion 62 of the cluster block 50.

(10) The part of the block-side insertion hole 63 in the vicinity of the second end face 62b includes the tapered surface 63a. The inner diameter of the block-side insertion hole 63 decreases from the second end face 62b toward the first end face 62a of the protrusion 62. This allows the jig-side pin 72 to be easily inserted into the block-side insertion hole 63.

(11) Since the cluster block 50 is prevented from being deformed or broken, entry of refrigerant into the cluster block 50 is limited. This ensures insulation between the connection terminals 40 and the housing 11.

The present embodiment may be modified as follows. The present embodiment and the following modifications can be combined as long as the combined modifications remain technically consistent with each other.

The shape of the cluster block 50 may be changed as long as the cluster block 50 has the pressed surface 50c, which is pressed by the pressing jig 70, in the portion constituting the radially inner portion 50b, and the contact surface 50d, which is allowed to contact the bottom wall 12a of the motor housing member 12, on a surface lined up with the pressed surface 50c in the axial direction of the stator core 25.

The outer surface 51a of the first wall portion 51 does not necessarily have to be allowed to contact the bottom wall 12a of the motor housing member 12 as long as the contact surface 50d of the cluster block 50 is allowed to contact the bottom wall 12a of the motor housing member 12.

The pressed surface 50c of the cluster block 50 may be formed by a part of the outer surface 52a of the second wall portion 52 that constitutes the radially inner portion 50b.

The block-side pin 61 of the cluster block 50 may be replaced by a protrusion, and the jig-side insertion hole 73 of the pressing jig 70 may be replaced by a recess. In short, the shapes of the engaging portions of the pressing jig 70 and the cluster block 50 may be changed as long as the cluster block 50 and the pressing jig 70 are engaged with each other.

The block-side insertion hole 63 of the cluster block 50 may be replaced by a recess, and the jig-side pin 72 of the pressing jig 70 may be replaced by a protrusion. In short, the shapes of the engaging portions of the pressing jig 70 and the cluster block 50 may be changed as long as the cluster block 50 and the pressing jig 70 are engaged with each other.

The block-side pin 61 of the cluster block 50 may be omitted, and the jig-side insertion hole 73 of the pressing jig 70 may be omitted.

The block-side insertion hole 63 of the cluster block 50 may be omitted, and the jig-side pin 72 of the pressing jig 70 may be omitted.

The outer diameter of the block-side pin 61 of the cluster block 50 may be constant.

The inner diameter of the block-side insertion hole 63 of the cluster block 50 may be constant.

Also, the block-side insertion hole 63 is not limited to a through-hole that extends through the protrusion 62, but may be a hole that opens in the second end face 62b of the protrusion 62 and is closed at the first end face 62a.

The outer diameter of the jig-side pin 72 of the pressing jig 70 may be constant.

The inner diameter of the jig-side insertion hole 73 of the pressing jig 70 may be constant.

The jig-side insertion hole 73 may be a through-hole that extends through the body 71.

The block-side pin 61 may be formed on the side surface of the cluster block 50 or the second end face 62b of the protrusion 62 as long as the block-side pin 61 is provided in a part of the cluster block 50 that constitutes the radially inner portion 50b and is allowed to be inserted into the jig-side insertion hole 73 of the pressing jig 70.

The block-side insertion hole 63 may be formed in the outer surface 52a of the second wall portion 52 as long as the block-side insertion hole 63 is formed in a part of the cluster block 50 that constitutes the radially inner portion 50b and is allowed to receive the jig-side pin 72 of the pressing jig 70. However, the block-side insertion hole 63 are not connected to the accommodating holes 50h.

The first end face 62a of the protrusion 62 may be flush with the outer surface 51a of the first wall portion 51 of the cluster block 50. In this case, the range in which the accommodating recess 123 is formed is extended to a part of the inner surface 121 of the bottom wall 12a that is opposed to the first end face 62a of the protrusion 62.

The second end face 62b of the protrusion 62 may be flush with the outer surface 52a of the second wall portion 52 of the cluster block 50. In this case, the escape portion 71d of the pressing jig 70 is unnecessary.

The first end face 62a of the protrusion 62 does not necessarily need to contact the inner surface 121 of the bottom wall 12a.

The second end face 62b of the protrusion 62 does not necessarily need to be pressed by the bottom surface of the escape portion 71d of the pressing jig 70.

The accommodating recess 123 in the bottom wall 12a of the motor housing member 12 may be omitted. In this case, the distance between the inner surface 121 of the bottom wall 12a and the coil end faces 262a of the second coil ends 262 in the axial direction of the rotary shaft 16 is defined as a distance B between the bottom wall 12a of the motor housing member 12 and the second coil ends 262.

The compression portion 17 is not limited to a scroll type, but may be, for example, a piston type or a vane type.

The motor drive circuit 19 does not necessarily need to be lined up with the compression portion 17 and the electric motor 18 in the axial direction of the rotary shaft 16. For example, the motor drive circuit 19 may be disposed on the radially outer side of the motor housing member 12. In this case, the through-hole 125 is formed in the circumferential wall 12b of the motor housing member 12.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor comprising:
   a compression portion, which compresses fluid;
   an electric motor, which drives the compression portion and includes a stator, the stator including a tubular stator core and a coil end, which protrudes from an end face in an axial direction of the stator core;
   a housing including
      a circumferential wall, which includes an inner circumferential surface to which the stator core is fixed, and
      an end wall, which is continuous with an end in the axial direction of the circumferential wall and is lined up with the electric motor in the axial direction of the stator core;
   a motor drive circuit, which drives the electric motor;
   a conductive member, which is electrically connected to the motor drive circuit via a through-hole in the housing;
   a motor wire, which is routed out of the coil end;
   a connection terminal, which connects the conductive member and the motor wire to each other; and
   a cluster block, which accommodates the connection terminal and includes a conductive member insertion hole, into which the conductive member is inserted, the cluster block being disposed between the end wall of the housing and the coil end in the axial direction of the stator core, wherein
   when viewed in the axial direction of the stator core, the conductive member insertion hole is located on an outer side in a radial direction of the inner circumferential surface of the stator core,
   the cluster block includes a motor-side end face in the vicinity of the electric motor,
   the motor-side end face includes a pressed surface,
   when viewed in the axial direction of the stator core, the pressed surface is located on an inner side in the radial direction of the inner circumferential surface of the stator core,
   the cluster block includes a housing-side end face in the vicinity of the end wall of the housing,
   the housing-side end face includes a contact surface, which is lined up with the pressed surface in the axial direction of the stator core, and
   the contact surface is allowed to contact the end wall of the housing.

2. The motor-driven compressor according to claim 1, wherein the cluster block includes an engaging portion, which is engaged with a jig configured to press the pressed surface.

3. The motor-driven compressor according to claim 2, wherein the cluster block includes another engaging portion.

4. The motor-driven compressor according to claim 1, wherein
   the cluster block includes a protrusion,
   the protrusion protrudes from a part of a side surface that connects the housing-side end face and the motor-side end face to each other, the part being located on an inner side in the radial direction of the inner circumferential surface of the stator core when viewed in the axial direction of the stator core, and
   the protrusion has a hole, which extends through the protrusion in the axial direction of the stator core.

5. The motor-driven compressor according to claim 1, wherein
   the end wall of the housing includes a motor-side wall surface in the vicinity of the electric motor,
   the motor-side wall surface includes a recess, which accommodates a part of the cluster block, and
   the contact surface of the contact surface is allowed to contact a bottom surface of the recess.

6. A method of assembling a motor-driven compressor, wherein the motor-driven compressor includes a compression portion, which compresses fluid,
   an electric motor, which drives the compression portion and includes a stator, the stator including a tubular stator core and a coil end, which protrudes from an end face in an axial direction of the stator core,
   a housing including
      a circumferential wall, which includes an inner circumferential surface to which the stator core is fixed, and
      an end wall, which is continuous with an end in the axial direction of the circumferential wall and is lined up with the electric motor in the axial direction of the stator core, a motor drive circuit, which drives the electric motor, a conductive member, which is electrically connected to the motor drive circuit via a through-hole in the housing, a motor wire, which is routed out of the coil end, a connection terminal, which connects the conductive member and the motor wire to each other, and a cluster block, which accommodates the connection terminal and includes a conductive member insertion hole, into which the conductive member is inserted, the cluster block being disposed between the end wall of the housing and the coil end in the axial direction of the stator core, the method of assembling the motor-driven compressor comprising:

disposing the cluster block between the end wall of the housing and the coil end in the axial direction of the stator core such that, when viewed in the axial direction of the stator core, the conductive member insertion hole is located on an outer side in a radial direction of an inner circumferential surface of the stator core;

pressing a part of the cluster block that is on an inner side in the radial direction of the inner circumferential surface of the stator core when viewed in the axial direction of the stator core toward the end wall of the housing from inside the stator core using a jig, thereby holding the cluster block with the jig and the end wall of the housing in a state in which a part of the cluster block that is located in the vicinity of the end wall of the housing and is lined up with a part pressed by the jig in the axial direction of the stator core is caused to contact the end wall of the housing;

inserting the conductive member into the through-hole of the housing and the conductive member insertion hole of the cluster block in a state in which the cluster block is held with the jig and the end wall of the housing; and connecting the conductive member and the connection terminal to each other.

\* \* \* \* \*